United States Patent [19]
Ernst et al.

[11] Patent Number: 4,861,270
[45] Date of Patent: Aug. 29, 1989

[54] FIRE FIGHTING TRAINER

[75] Inventors: James Ernst, Livingston; Steven Williamson, Haledon; George Rogers, Linden; Dominick Musto, Middlesex, all of N.J.

[73] Assignee: Symtron Systems, Inc., Fair Lawn, N.J.

[21] Appl. No.: 238,453

[22] Filed: Aug. 30, 1988

[51] Int. Cl.⁴ .............................................. G09B 9/00
[52] U.S. Cl. .................................................. 434/226
[58] Field of Search ................................ 434/226, 219

[56] References Cited

U.S. PATENT DOCUMENTS

| | | | |
|---|---|---|---|
| 3,071,872 | 1/1983 | Hart | 434/226 |
| 3,156,908 | 11/1964 | Kopan | 169/1 R X |
| 3,451,147 | 6/1969 | Mehlig et al. | 434/219 |
| 3,675,342 | 7/1972 | Wolff | 434/226 |
| 3,675,343 | 7/1972 | Swiatosz et al. | 434/226 |
| 4,001,949 | 1/1977 | Francis | 434/226 |
| 4,299,579 | 11/1981 | Swiatosz et al. | 434/226 |
| 4,303,396 | 12/1981 | Swiatosz | 434/226 |
| 4,303,397 | 12/1981 | Swiatosz | 434/226 |
| 4,526,548 | 7/1985 | Livingston | 434/226 |

Primary Examiner—William H. Grieb
Attorney, Agent, or Firm—Richard T. Laughlin

[57] ABSTRACT

A fire fighting trainer for use in training fire fighters is provided. The fire fighting trainer includes a structure having a plurality of chambers. Each chamber contains real or simulated items, which are chosen from a group of items, such as furniture and fixtures and equipment. The trainer also includes a smoke generating system having a smoke generator and a smoke conduit. The smoke conduit has a smoke line with an outlet for each chamber. The trainer also includes a propane gas flame generating system having at least one propane gas pressure controller and a propane gas conduit. The propane gas conduit has a gas line with a burner control and a burner for each chamber. The trainer has a main control panel for regulating the flame generating system and the smoke generating system and for controlling the flame and smoke in each chamber. The trainer also has a sensor assembly in each chamber, which is connected to the main control panel to sense and report what extinguishing material or medium or agent is being used in each chamber during a test of trainees or fire fighters, so that the flame and smoke can be simultaneously reset to suit the conditions in the chamber based upon the reported extinguishing agent used. Each sensor assembly includes a water sensor, a foam sensor, a powder sensor, and a temperature sensor.

7 Claims, 6 Drawing Sheets

FIRE FIGHTING TRAINER

The invention relates to a fire fighting trainer, and in particular the invention relates to a fire fighting trainer having a plurality of sensors for sensing extinguishing materials used on a fire.

BACKGROUND OF THE INVENTION

The prior art fire fighting trainer is described in U.S. Pat. No. 4,526,548, issued July 2, 1985. Related patents include U.S. Pat. Nos. 3,071,872, issued Jan. 8, 1963; 3,156,908, issued Nov. 10, 1964; 3,451,147, issued June 24, 1969; 3,675,342, issued July 11, 1972; 3,675,343, issued July 11, 1972, and 4,001,949, issued Jan. 11, 1977 and 4,303,396 issued Dec. 1, 1981.

The prior art fire fighting trainer includes a plurality of chambers having respective contents including items chosen from a group of items including furniture and fixtures and equipment, a smoke generating system having a plurality of outlets disposed in the respective chambers, and a flame generating system having a plurality of outlets disposed in the respective chambers.

One problem with the prior art fire fighting trainer is that there is no way to determine which ones of the extinguishment agents being used by the fire fighters simultaneously with the testing of the fire fighters.

SUMMARY OF THE INVENTION

According to the present invention, a fire fighting trainer is provided. This trainer comprises a plurality of chambers having respective contents including items chosen from a group of items including furniture and fixtures and equipment, a smoke generating system having plurality of outlets disposed in the respective chambers, a flame generating system having a plurality of outlets disposed in the respective chambers, and a sensing and control system having a plurality of sensors disposed in the respective chambers and connecting to a control panel, for determining which ones of the materials are being used by the fire fighters simultaneously with the testing of the fire fighters.

By using the sensing system having a plurality of sensors disposed in the respective chambers and connecting to a control panel, the problem of not being able to determine which ones of the materials are being used by the fire fighter simultaneously with the testing of the fire fighters is avoided.

The foregoing and other objects, features and advantages will be apparent from the following description of the preferred embodiment of the invention as illustrated in the accompanying drawings.

DESCRIPTION OF THE PREFERRED EMBODIMENT

Figure 1:
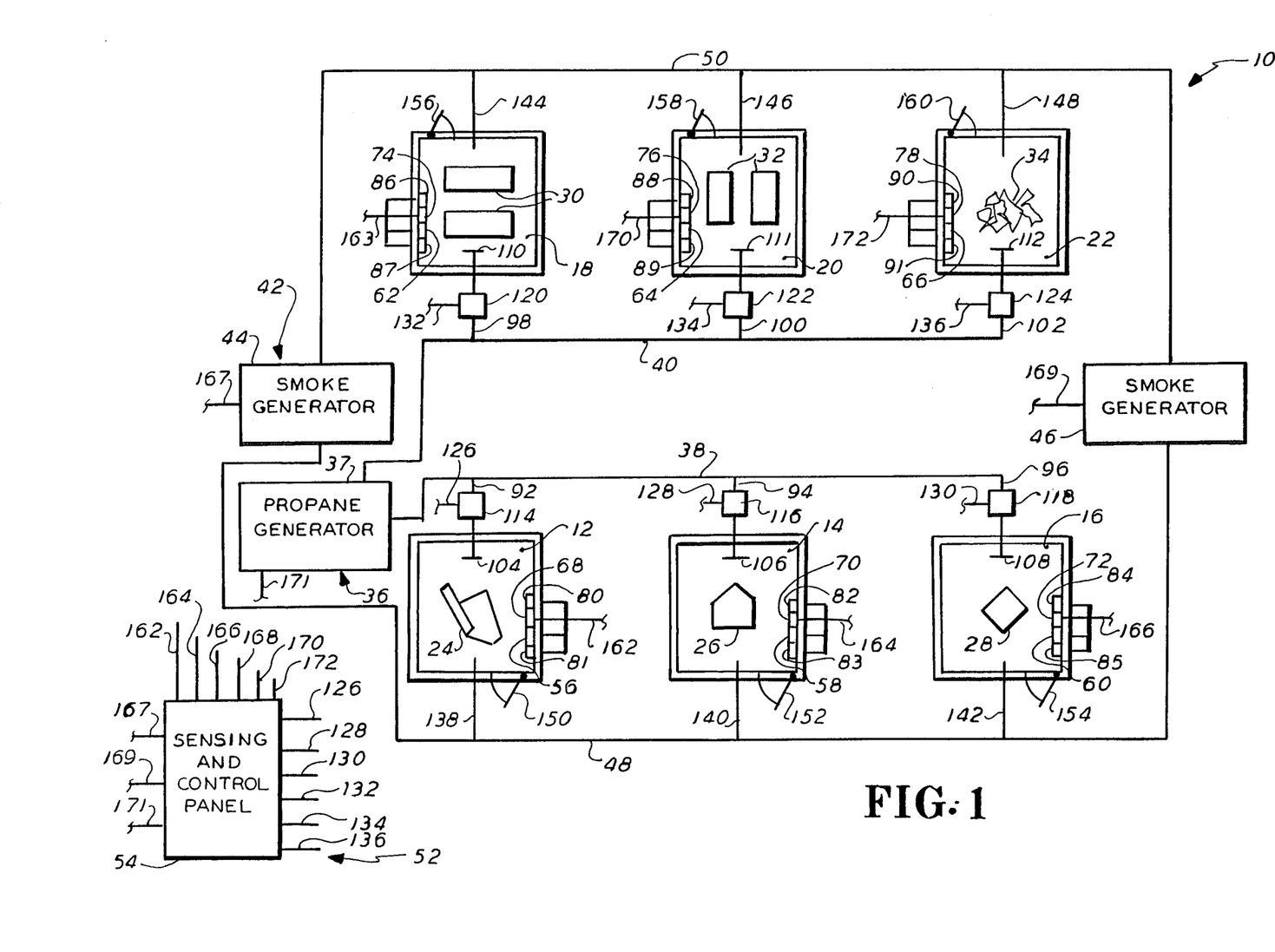
FIG. 1 is a schematic plan view of a fire fighting trainer according to the present invention.

As shown in FIG. 1, a fire fighting trainer 10 is provided. Trainer 10 includes a plurality of chambers 12, 14, 16, 18, 20, 22, which are separate chambers in a structure, and which contain respective contents 24, 26, 28, 30, 32, 34, that are chosen from a group of items of furniture and fixtures and equipment, some of which are simulated items.

For example, chambers 24, 26 have representations of items such as wood furniture items, that require water to extinguish a fire therein. Chambers 28, 30 have representations of items, such as electrical equipment items, that require dry powder or inert gas to extinguish a fire therein. Chambers 32, 34 have representations of items, such as certain chemical items, that require a foam to extinguish a fire therein.

Trainer 10 also has a propane gas system 36, which has a propane gas inlet pressure controller 37, and which has distribution piping 38 and 40. Trainer 10 also has a smoke generating system 42, which has a left smoke generator 44, a right smoke generator 46, and smoke conduit 48 and smoke conduit 50. Systems 36 and 42 generate flames and smoke within selected ones of, or all of, the chambers 12, 14, 16, 18, 20, 22.

Trainer 10 also has a sensing and control system 52, which has a control panel 54. System 10 includes water sensors 56, 58, 60, 62, 64, 66, and includes foam sensors 68, 70, 72, 74, 76, 78, and includes powder sensors 80, 82, 84, 86, 88, 90, and includes temperature sensors 81, 83, 85, 87, 89, 91, each of which are disposed in respective chambers 12, 14, 16, 18, 20, 22.

Propane distribution pipe 38 has propane gas lines 92, 94, 96, which connect to respective chambers 12, 14, 16. Propane distribution pipe 40 has propane gas lines 98, 100, 102, which connect to respective chambers 18, 20, 22.

Gas lines 92, 94, 96 connect to respective burners 104, 106, 108, which are disposed inside respective chambers 12, 14, 16. Gas lines 98, !00, 102 connect to respective burners 110, 111, 112, which are disposed inside respective chambers 18, 20, 22.

Burners 104, 106, 108 which are shown near the bottom of FIG. 1 have respective control units 114, 116, 118. Burners 110, 111, 112 which are shown near the top of FIG. 1 have respective control units 120, 122, 124.

Control units 114, 116, 118 have respective conductors 126, 128, 130, which connect to panel 54. Control units 120, 122, 124 have respective conductors 132, 134, 136, which connect to panel 54.

Smoke conduit 48 has smoke lines 138, 140, 142, which connect to respective chambers 12, 14, 16. Smoke conduit 50 has smoke lines 144, 146, !48, which connect to respective chambers 18, 20, 22.

Chambers 12, 14, 16, 18, 20, 22 have respective doors 150, 152, 154, 156, 158, 160.

Control panel 54 has cables 162, 164, 166, which go to respective chambers 12, 14, 16. Control panel 54 also has cables 168, 170, 172, which go to respective chambers 18, 20, 22. Each of the cables 162, 164, 166, 168, 170, 172 has four conductors. For example, cable 162 has four conductors including a first conductor connecting to water sensor 56, a second conductor connecting to foam sensor 68, a third conductor connecting to powder sensor 80, and a fourth conductor connecting to temperature sensor 81.

Each of the chambers 12, 14, 16, 18, 20, 22, stores or contains a different item or items, so that each chamber has a different type of fire, thereby requiring a different medium to put out the fire in each chamber. The water sensor 56, foam sensor 68, and powder sensor 80 in chamber 12 detects three different extinguishing materials or mediums or agents, which are reported to the control panel 54. Control panel 54 can be operated to regulate the amount of fire and smoke in typical chamber 12, or to shut off the fire and smoke in chamber 12. Control panel 54 can also be used to record the results of the actions of the trainees in chamber 12. Some items in the chambers require two or more combination extinguishing agents, such as water and foam, to extinguish the fire.

Figure 2:
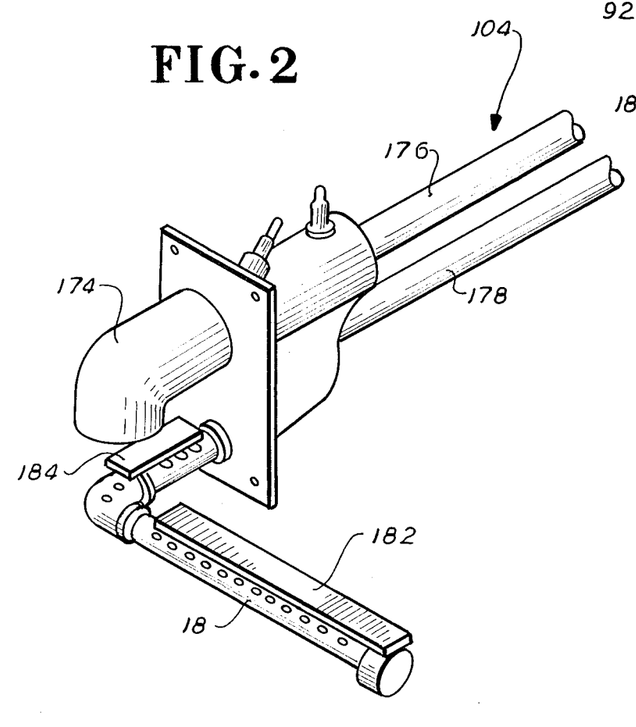
FIG. 2 is an enlarged perspective view of a portion of FIG. 1.

In FIG. 2, burner 104 is shown. Burner 104 is identical in construction to burners 106, 108, 110, 111, 112. The burners are designed to operate reliably under severe conditions such as being subject to application of water and other extinguishing agents.

Figure 3:
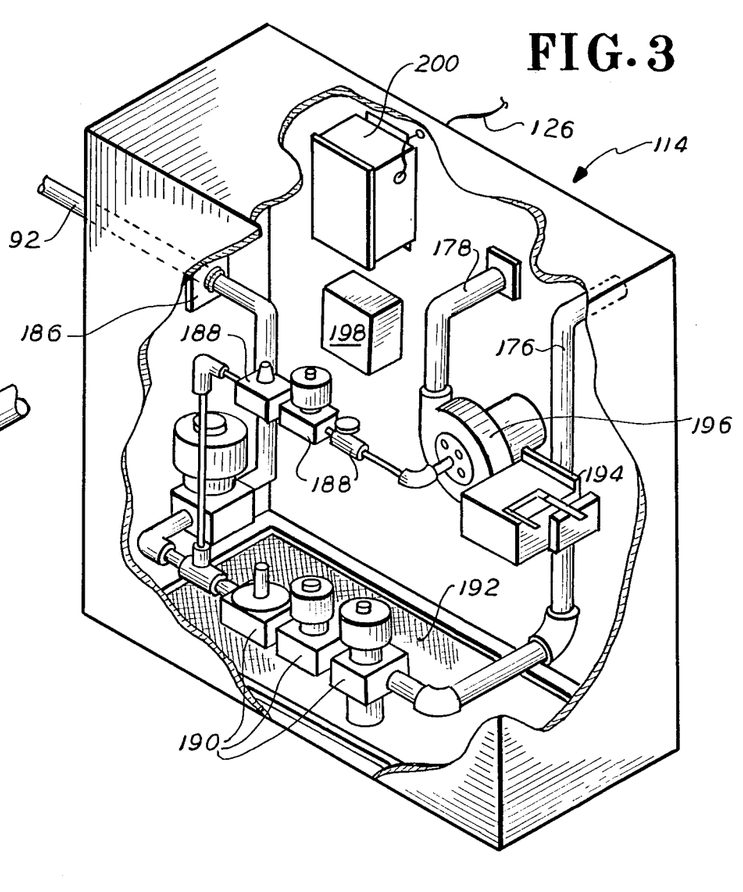
FIG. 3 is an enlarged perspective view of a portion of FIG. 1.

In FIG. 3, burner control assembly 114 is shown. Burner control assembly 114 is identical in construction to burner control assemblies 116, 118, 120, 122, 124. Burner control assembly 114 includes a supply gas inlet 186, pilot gas components 188, main ga components 190, an air inlet filter 192, and one or more motor controlled gas valves 194. Burner control assembly also includes a pilot blower 196, a flame safeguard unit 198, and an ignition transformer unit 200.

In FIG. 3, gas enters supply line 92. A solenoid operated shutoff valve in line 92 controls the flow of gas to the pilot gas line 178 and to the main gas line 176. The pilot system includes components 188, blower 196 and pilot gas line 178 to deliver a proper mixture of propane and air to the burner head 174. The main gas system includes supply line 92, components 190, one or more gas flow control valves 194, and one or more main line 176 to deliver propane gas to one or more burner elements 181.

Burner head member 174 mounts on a wall of a unit, such as a fireplace unit, or the like. The shape and configuration and materials of burner head 174 are such as to provide for reliable operation of pilot and main flames when subject to any of the various extinguishing agents.

Pilot gas components 188 include a pressure regulator, a manual shutoff valve, and a solenoid-operated pilot gas valve. Flame safeguard unit 198 is an automatic self-check unit. Main gas components 190 include a pressure regulator, a manual shutoff valve, and a solenoid-operated main gas valve.

Burner element 180 is enclosed in a fireplace (not shown), which is disposed behind real or simulated items, such as electrical or electronic consoles, or below a mattress or the like, or behind a trash can or a kitchen stove, or a sofa or the like. One or more elements may be utilized for each burner.

In FIG. 2, burner element 180 contains drilled holes configured to satisfy a flame location. One or more elements may be utilized. The holes are about one-quarter inch in size and serve as gas nozzles. When main gas is introduced to element 180, it is ignited by the pilot and produces flame appearance as desired. Cover plates 182, 184 prevent materials from falling into the holes in element 180.

Figure 4:
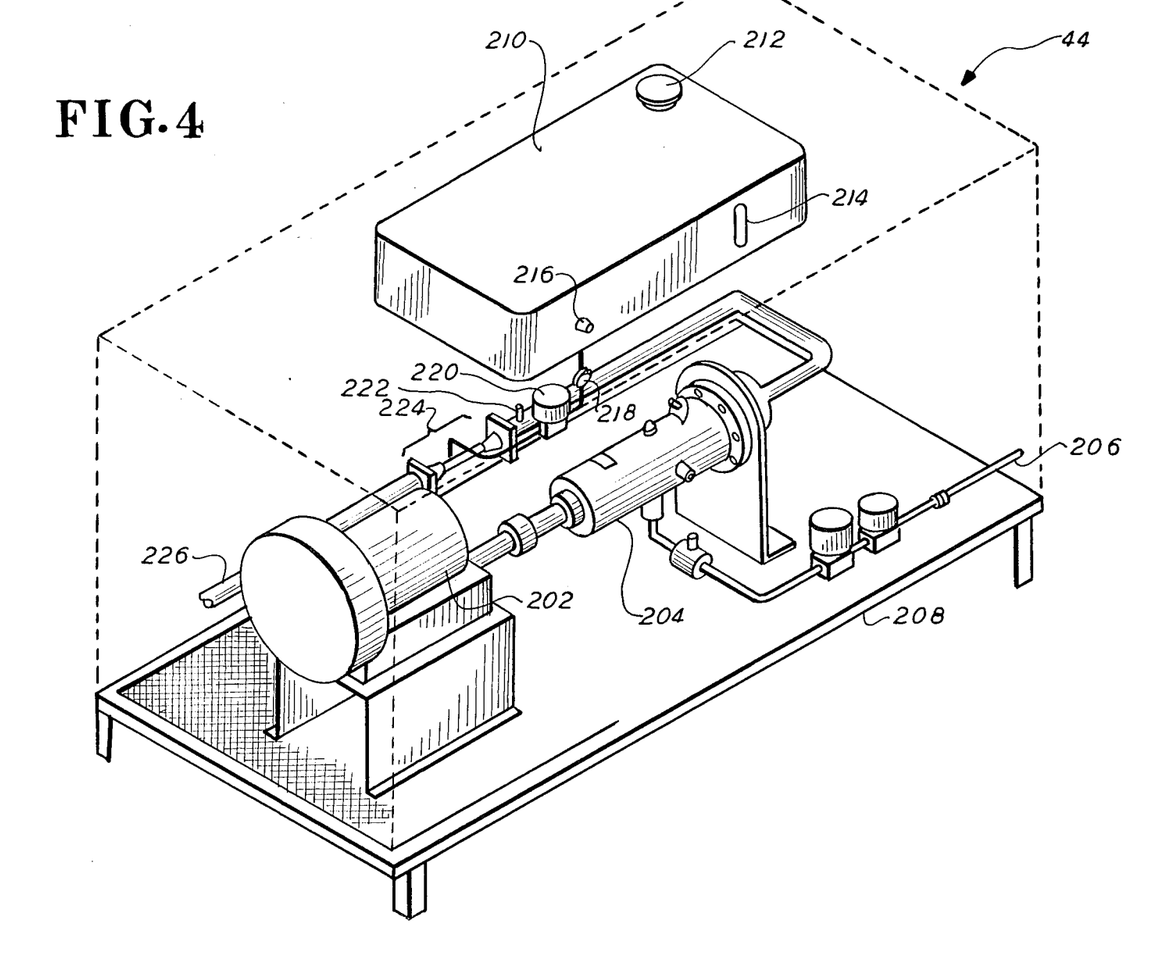
FIG. 4 is an enlarged perspective view of a portion of FIG. 1.
Figure 5:
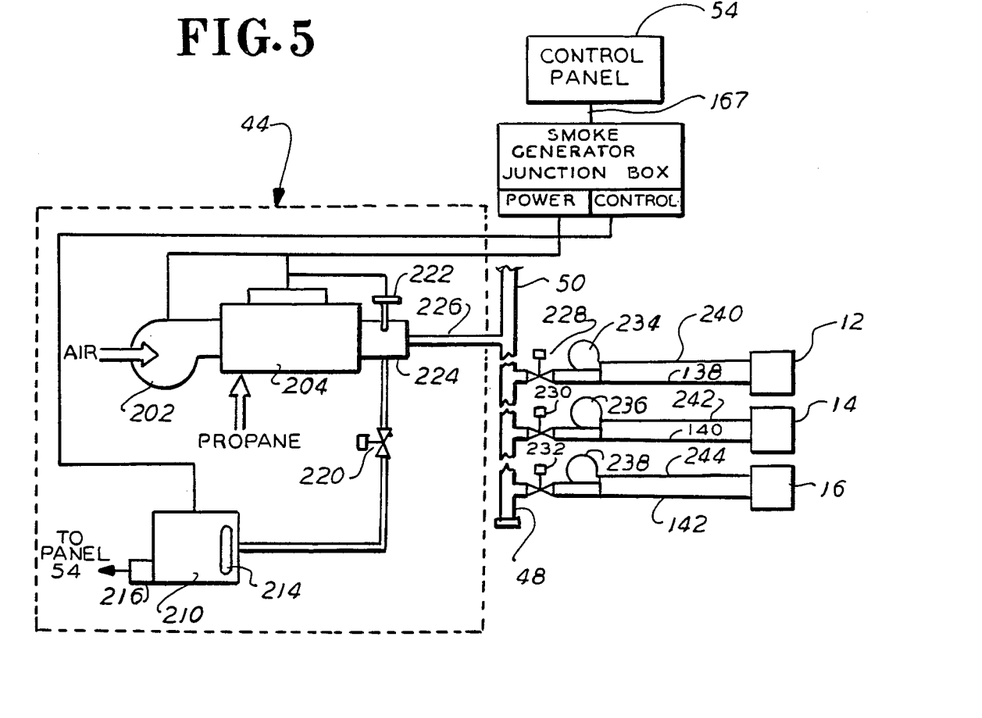
FIG. 5 is a schematic diagram corresponding to a portion of FIG. 1.

In FIG. 4, smoke generator 44 is shown. Smoke generator 44 is identical in construction to smoke generator 46. Smoke generator 44 includes an air blower 202, an air heater 204, a propane line 206, and an enclosure 208. Smoke generator 44 also includes a fuel tank 210, which has a cap 212, a sight glass 214, and a level switch 216. Fluid tank 210 has a line with a metering valve 218 and a solenoid Valve 220. Air heater 204 is connected by a line with a temperature monitor 222 to an injector nozzle 224. Injector nozzle 224 has an outlet line 226. In FIG. 5, outlet line 226 connects to conduits 48 and 50. Conduit 48 is supplied usually by smoke generator 44. Conduit 50 is supplied usually by smoke generator 46. Additional valves (not shown) in conduits 48 and 50 are provided to use such smoke supply arrangement, or to change such smoke supply arrangement as desired. Conduit 48 has solenoid valves 228, 230, 232, which connect to respective smoke lines 138, 140, 142 to respective chambers 12, 14, 16. Excess air blowers 234, 236, 238, which have respective air lines 240, 242, 244 to respective chambers 12, 14, 16 are also provided. Panel 54 controls valves 228, 230, 232 and controls blowers 234, 236, 238.

Injector nozzle 224 is used to inject a fine mist of light oil of selected content into a hot air stream. High velocity air in injector nozzle 224 vaporizes the light oil fluid. Sufficient simulated smoke is delivered to the chambers in this way.

Outlets of smoke lines 138, 140, 142, 144,146, 148, which are disposed inside respective chambers 12, 14, 16, 18, 20, 22, connect to respective fireplaces (not shown), which are disposed below or behind selected fixtures, furniture or equipment, as desired. Typical burner element 180 and typical smoke line 138 connect to the same fireplace, in order to simulate a fire at the fireplace. The fireplace is defined to mean a common assembly area for training in extingushment of a particular fire, and not a residential type of fireplace.

Smoke generator 44 produces simulated smoke to chambers 12, 14, 16. Smoke generator 46 produces simulated smoke to chambers 18, 20, 22. Shutoff valves (not shown) in conduits 48 and 50 can redistribute smoke to chambers as desired.

The smoke generating system 42 is necessary because the propane gas system 36 produces virtually no smoke. The propane in burners 104, 106, 108, 110, 112, 114 is burned without additional combustion air to produce a large, yellow-orange flame. The burners specifically use propane gas to achieve realistic flame appearance and response to agent application.

Each of the chambers 12, 14, 16, 18, 20, 22 has a different type of fire, and has a respective detector assembly, which can sense and can report to control panel 54, if water, foam, powder, or inert gas is being applied to the fire. If the correct application is made, the fire is extinguished. The control panel 54 is operated to control each of the burners 104, 106, 108, 110, 111, 112, which are located in respective chambers 12, 14, 16, 18, 20, 22, in accordance with the intensity of the fire therein.

The operator of the control panel 54 can know which of the materials, such as water, foam, or powder, is being used in each chamber by the fire fighters, simultaneously with the testing of the fire fighters. In this way, the operator can regulate the intensities of the fires in the chambers, or can shut off the fires and smoke inflow, if necessary, by regulating the smoke generating system 42 and the fire generating or system 36 from the control panel 54. The control system 52 monitors conditions within the trainer and is used to automatically shut the trainer down if safety is jeopardized. Control panel 54 can have a computer, in order to provide a scenario in the testing program. A menu of selections can be used in the software of the computer. The trainer is under the control of the instructor and exercises can be repeated or changed at the control panel.

Figure 6:
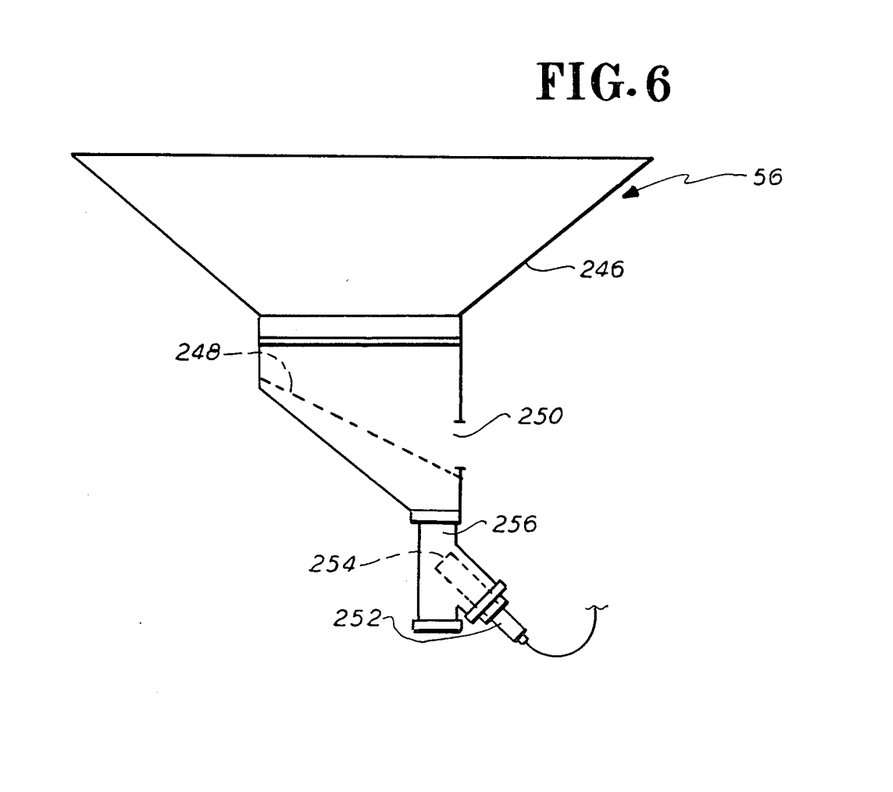
FIG. 6 is an enlarged perspective view of a portion of FIG. 1.

In FIG. 6, water sensor 56 is shown. Sensor 56 is identical in construction to sensors 58, 60, 62, 64, 66. Water sensor 56 includes a collection funnel 246, a screen 248, an opening 250, and a magnetostrictive or other fluid sensor unit 252, which has a face 254 that protrudes into a pipe 256.

Sensor unit 252 is located in the neck of the collection funnel pipe 256. Funnel 246 is shaped to fit in a grating below or behind burner 104, or below an item, such as a fixture or a fireplace or the like. Sensor unit 252 is disposed at a 45 degree angle to the vertical axis of pipe 256, thereby preventing the formation of puddles or the buildup of material on the face 254 of unit 252.

Figures 7, 8:
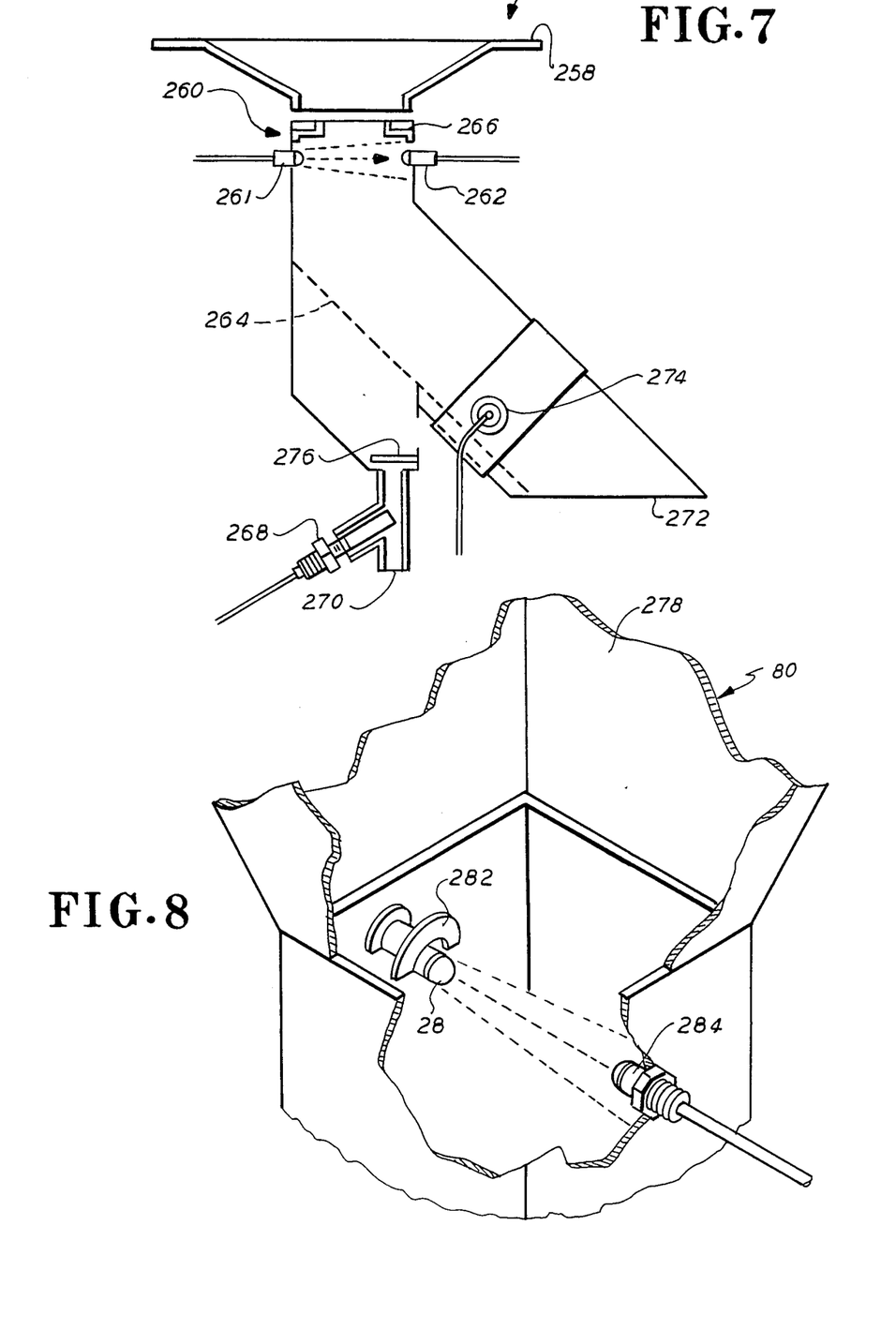
FIG. 7 is an enlarged perspective view of a portion of FIG. 1.
FIG. 8 is an enlarged perspective view of a portion of FIG. 1.

In FIG. 7, sensor 68, which is a multi-agent sensor, is shown. Sensor 68 is capable of detecting and distinguishing between water, foam and powder. Sensor 68 is identical in construction to foam sensors 70, 72, 74, 76, 78. Sensor 68 includes a collection funnel 258, an upper powder sensor unit 260, an infrared source 261, an infrared detector 262, and a foam and water separator 264. Sensor 68 also includes an upper shield 266, a magnetostrictive water sensor 268, a water exhaust opening 270, and an exhaust chute 272. Sensor 68 also has a lower throughbeam foam sensor unit 274 and a lower shield 276.

Sensor 68 separates the foam from the water, both of which enter through funnel 258. Funnel 258 is shaped to fit below or behind burner 104 or below or behind an item, such as a fixture. Separator 264 separates the water from the foam. Water passes to outlet 270. Foam passes to foam chute 272. Foam sensor unit 274 is a commercially available unit. Water sensor unit 268 and foam sensor unit 274 respond to their particular agent or material.

Foam sensor unit 274 has a sonic beam, the breaking of which causes a contact closure upon passage of foam, thereby detecting the presence of foam as the extinguishing agent.

In FIG. 8, a powder sensor 80 is shown. Powder sensor 80 is identical in construction to powder sensors 82, 84, 86, 88, 90. Powder sensor 80 includes a collection funnel 278, an infrared source 280, a shield 282, and a detector 284.

Sensor unit source 280 and detector 284 detect powder by detecting the powder cloud that breaks the light beam passing therebetween. Source 280 and detector 284 detect a powder cloud but do not detect, or see, water or foam. The assembly of source 280 and detector 284 is a commercially available item. Funnel 278 is shaped to fit below or behind burner 104, or a fixture, or the like.

Source 280 and detector 284 have an infrared light beam, the breaking of which by a powder cloud, signals the presence of powder as the extinguishing agent.

Figure 9:
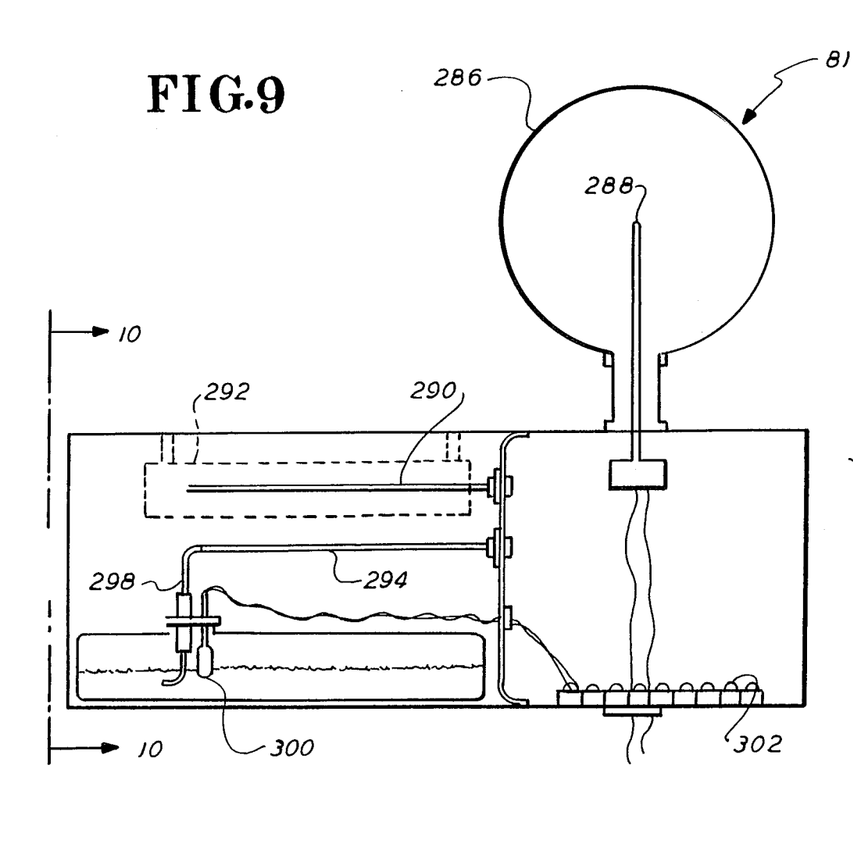
FIG. 9 is an enlarged perspective view of a portion of FIG. 1.
Figure 10:
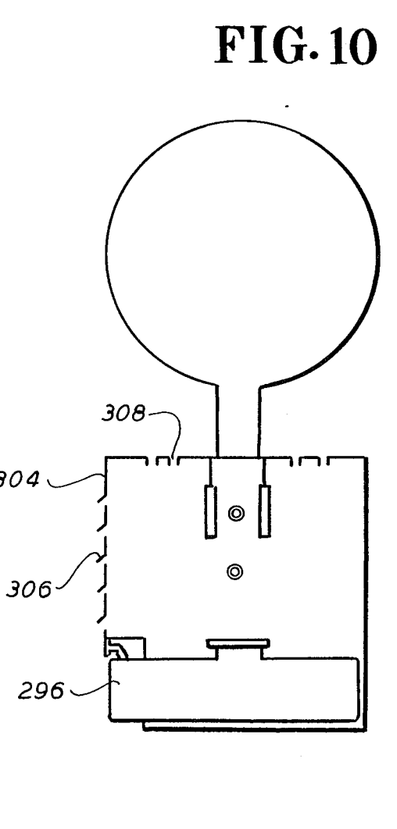
FIG. 10 is a section view as taken along the line 10—10 of FIG. 9.

In FIG. 9 and 10, the temperature sensor 81 is shown. Temperature sensor 81 is identical in construction to sensors 83, 85, 87, 89, 91. Temperature sensor 81 includes a blackened copper sphere 286, a globe temperature thermocouple 288, a dry-bulb temperature thermocouple 290, a baffle 292, and a wet bulb temperature thermocouple 294. Temperature sensor 81 also includes a liquid reservoir 296, which has a wick 298 and a level switch 300. Temperature sensor 81 also has a terminal board 302 and a housing 304, which has louvers 306 and a slot 308.

Temperature sensor 81 is installed in chamber 12 to insure that temperature levels never reach a dangerous level for trainees and instructors and other users. Readings are transmitted to control panel 54, where action is taken to reduce the temperature in the chamber, or to close the smoke and gas lines to the chamber. The temperature sensor 81 is preferably located on or near the ceiling of chamber 12.

The advantages of trainer 10 are indicated hereafter.

1. The sensing and control system 52 determines the material, such as water or foam or powder, which is being used by the fire fighters in each chamber, and reports such information to the control panel 54 at the same time; and the amount of flames and smoke in any chamber can be reset immediately, for better safety and teaching.

2. The sensing and control system 52 receives the information about the material used in each chamber for extinguishing the fire whereby the information can be recorded in a report on the test of the fire fighters.

3. The items 24, 26, 28, 30, 32, 34, which are stored in respective chambers 12, 14, 16, 18, 20, 22 can be house items, such as respective living room items, bedroom items, kitchen items, cellar items, attic items and office items, or can be industrial items, such as respective chemical storage items, electronic parts items, electronic console items, laboratory items, office items and file room items, or can be restaurant or hotel items, so that trainer 10 provides a test ground for different situations.

4. In a test of fire fighters, some of the chambers can be excluded or shut down, depending on the size of the test, or the selection of chambers desired, for better operating efficiency.

While the invention has been described in its preferred embodiment, it is to be understood that the words which have been used are words of description rather than limitation and that changes may be made within the purview of the appended claims without departing from the true scope and spirit of the invention in its broader aspects.

What is claimed is:

1. A fire fighting trainer comprising:
a plurality of chambers having respective contents including items chosen from a group of items including furniture and fixtures and equipment;
a smoke generating means having a plurality of outlets disposed in the respective chambers;
a flame generating means having a plurality of outlets disposed in the respective chambers; and
a sensing and control means having a plurality of sensor assemblies disposed in the respective chambers and each sensor assembly connecting to a main control panel, wherein
each said sensor assembly includes a a multi-agent sensor unit comprising:
a collection funnel for receiving an extinguishing medium portion;
a separation means for separating out foam from the extinguishing medium portion;
a foam chute connecting to the collection funnel;

a sonic beam source and detector mounted inside the foam chute for sensing the presence of foam in the chute;

an outlet pipe connecting to the collection funnel with an outlet opening disposed below the separation means;

a magnetostrictive fluid sensor unit mounted on and extending into the outlet pipe above the outlet opening for sensing the presence of water in the outlet pipe; and an infrared source and detector mounted inside the collection funnel for sending the the presence of a cloud of powder in the collection funnel.

2. The trainer of claim 1, wherein the flame generating a propane gas inlet pressure controller;

conduit means connecting to the propane gas inlet pressure controller;

a gas line to each chamber from the conduit means;

control means for each chamber connecting to the gas line; and a burner inside each chamber connecting to the control means;

3. The trainer of claim 2, wherein said burner comprises:

a main gas line;

a pilot gas line;

a head member connecting to the main gas line and to the pilot gas line; and a burner element having orifice holes for flames and connecting to the head member.

4. The trainer of claim 1, wherein the smoke generating means comprises:

at least one smoke generator;

smoke conduit means connecting to the smoke generator; and a smoke line to each chamber from the smoke conduit means and having an outlet disposed inside each chamber.

5. The trainer of claim 4, wherein said smoke generator comprises:

a air blower;

an air heater connecting to the air blower;

an injector nozzle connecting to the air heater;

a fluid tank containing a selective light oil and connecting to the injector nozzle; and a outlet means connecting to the injector nozzle at one end thereof and connecting to the smoke conduit at the other end thereof.

6. The trainer of claim 1, wherein each said sensor assembly includes a temperature sensor comprising:

a globe temperature thermocouple surrounded by a blackened metal sphere;

a housing for supporting the globe temperature thermocouple and blackened metal sphere on the outside thereof;

a dry-bulb temperature thermocouple means supported by the housing on the inside thereof; and a wet-bulb temperature thermocouple means supported by the housing on the inside thereof.

7. A method of training and testing fire fighters including:

providing at least one training chamber; choosing selected items from a group of items of furniture and fixtures and equipment; placing the selected items in the chamber; introducing propane gas flames and simulated smoke into the chamber next to the selected items; introducing fire fighters into the chamber to put out the simulated fire using one of a group of extinguishing agents; sensing which one of the extinguishing agents is being used by the fire fighters in the chamber; simultaneously regulating and setting a level of fire and a level of smoke in the chamber depending upon the extinguishing agent being used; and recording the test results of time and decisions of the fire fighters.

* * * * *

UNITED STATES PATENT AND TRADEMARK OFFICE
CERTIFICATE OF CORRECTION

PATENT NO. : 4,861,270

DATED : August 29, 1989

INVENTOR(S) : Ernst et al

It is certified that error appears in the above-identified patent and that said Letters Patent is hereby corrected as shown below:

Column 1, line 3, the following should be inserted:

-- This invention was made with Government support under contract N61339-85-0053 awarded by the Department of the Navy. The Government has certain rights in this invention. --

Signed and Sealed this

Tenth Day of December, 1991

Attest:

HARRY F. MANBECK, JR.

Attesting Officer

Commissioner of Patents and Trademarks

REEXAMINATION CERTIFICATE (1911th)
United States Patent [19]
Ernst et al.

[11] B1 4,861,270
[45] Certificate Issued  Jan. 26, 1993

[54] FIRE FIGHTING TRAINER

[75] Inventors: James Ernst, Livingston; Steven Williamson, Haledon; George Rogers, Linden; Dominick Musto, Middlesex, all of N.J.

[73] Assignee: Symtron Systems, Inc., Fair Lawn, N.J.

Reexamination Request:
No. 90/002,513, Nov. 21, 1991

Reexamination Certificate for:
Patent No.: 4,861,270
Issued: Aug. 29, 1989
Appl. No.: 238,453
Filed: Aug. 30, 1988

Certificate of Correction issued Dec. 10, 1991.

[51] Int. Cl.$^5$ .............................................. G09B 9/00
[52] U.S. Cl. ..................................................... 434/226
[58] Field of Search ........................................ 434/226

[56] References Cited
U.S. PATENT DOCUMENTS

| | | | |
|---|---|---|---|
| 3,071,872 | 1/1963 | Hart | 35/8 |
| 3,156,908 | 10/1964 | Kopan et al. | 340/228 |
| 3,451,147 | 6/1969 | Mehlig et al. | 35/13 |
| 3,675,342 | 7/1972 | Wolff | 35/10a |
| 3,675,343 | 7/1972 | Swiatosz et al. | 35/10 |
| 4,001,949 | 1/1977 | Francis | 35/10 |
| 4,299,579 | 10/1981 | Swiatosz et al. | 434/226 |
| 4,303,396 | 12/1981 | Swiatosz | 434/226 |
| 4,303,397 | 12/1981 | Swiatosz | 434/226 |
| 4,526,548 | 7/1985 | Livingston | 434/226 |
| 4,861,270 | 8/1989 | Ernst et al. | 434/226 |

OTHER PUBLICATIONS

Cordell, Curtis et al., "Training Effectiveness Evaluation (TEE) of the Advanced Fire Fighting Training System", Feb., 1983.
Trainer Engineering Report for Device 19F1A Advanced Fire Fighting Surface Ship Trainer, Dec. 1985 to Jan. 1988.
Swiatosz, Edmund et al., "Experimental Research for Advanced Firefighting Simulators", May 1978.
Meldrum, Graham, "Fire Training Via Computer", Fire Engineering, Aug. 1984.
Carey, R. F., "Computers and Incident Simulation", Fire Command, Dec. 1987.
Swiatosz, E., et al., "Feasibility Demonstration of a Non-Pollutant Synthetic Fire Fighting Trainer", Dec. 1974.
1st Interservice/Industry Training Equipment Conference, Nov. 1979.
Austin Electronics Advertisement, Fire Engineering, Jul. 1987.
Sansone, S., et al., "New Fire Simulator At FDNY Training Academy", WNYF, no later than Aug. 1987.
Swiatosz, Edmund, "Analysis of Proposed Smoke Generator Concepts For Training Systems", Mar. 1983.

*Primary Examiner*—William H. Grieb

[57] ABSTRACT

A fire fighting trainer for use in training fire fighters is provided. The fire fighting trainer includes a structure having a plurality of chambers. Each chamber contains real or simulated items, which are chosen from a group of items, such as furniture and fixtures and equipment. The trainer also includes a smoke generating system having a smoke generator and a smoke conduit. The smoke conduit has a smoke line with an outlet for each chamber. The trainer also includes a propane gas flame generating system having at least one propane gas pressure controller and a propane gas conduit. The propane gas conduit has a gas line with a burner control and a burner for each chamber. The trainer has a main control panel for regulating the flame generating system and the smoke generating system and for controlling the flame and smoke in each chamber. The trainer also has a sensor assembly in each chamber, which is connected to the main control panel to sense and report what extinguishing material or medium or agent is being used in each chamber during a test of trainees or fire fighters, so that the flame and smoke can be simultaneously reset to suit the conditions in the chamber based upon the reported extinguishing agent used. Each sensor assembly includes a water sensor, a foam sensor, a powder sensor, and a temperature sensor.

REEXAMINATION CERTIFICATE ISSUED UNDER 35 U.S.C. 307

THE PATENT IS HEREBY AMENDED AS INDICATEE BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claims 1,2 and 7 are determined to be patentable as amended.

Claims 3–6 dependent on an amended claim are determined to be patentable.

1. A fire fighting trainer comprising:
   a plurality of chambers having respective contents including items chosen from a group of items including furniture and fixtures and equipment;
   a smoke generating means having a plurality of outlets disposed in the respective chambers;
   a flame generating means having a plurality of outlets disposed in the respective chambers; and
   a sensing and control means having a plurality of sensor assemblies disposed in the respective chambers and each sensor assembly connecting to a main control panel, wherein
   each said sensor assembly includes a multi-agent sensor unit comprising:
   a collection funnel for receiving an extinguishing medium portion;
   a separation means for separating out foam from the extinguishing medium portion;
   a foam chute connecting to the collection funnel;
   a sonic beam source and detector mounted inside the foam chute for sensing the presence of foam in the chute;
   an outlet pipe connecting to the collection funnel with an outlet opening disposed below the separation means;
   a magnetostrictive fluid sensor unit mounted on and extending into the outlet pipe above the outlet opening for sensing the presence of water in the outlet pipe; and
   an infrared source and detector mounted inside the collection funnel for [sending] *sensing* the [the] presence of a cloud of powder in the collection funnel.

2. The trainer of claim 1, wherein the flame generating *means comprises*
   a propane gas inlet pressure controller;
   a conduit means connecting to the propane gas inlet pressure controller;
   a gas line to each chamber from the conduit means;
   a control means for each chamber connecting to the gas line; and
   a burner inside each chamber connecting to the control means[;].

7. A method of training and testing fire fighters *and recording during the test decisions made by the fire fighters for extinguishing a fire* including:
   providing at least one training chamber; choosing *a* selected *item or* items from a group of items of furniture, [and] fixtures and equipment; placing the selected *item or* items in [the] *said at least one* [of the chambers] *chamber;* introducing propane gas flames and simulated smoke into the chamber next to the selected items; introducing fire fighters into the chamber to [put out the] simulate[d] *extinguishing the* fire using one of a group of extinguishing agents; sensing which one of the extinguishing agents is being used by the fire fighters in the chamber; simultaneously *with the application of the extinguishing agent* regulating and setting a level of *flame of the* fire and a level of smoke in the chamber [depending upon] *corresponding to* the *amount of* extinguishing agent being used; and recording the test results of time and decisions of the fire fighters.

* * * * *

REEXAMINATION CERTIFICATE (3035th)

United States Patent [19]
Ernst et al.

[11] B2 4,861,270
[45] Certificate Issued Oct. 29, 1996

[54] FIRE FIGHTING TRAINER

[75] Inventors: James Ernst, Livingston; Steven Williamson, Haledon; George Rogers, Linden; Dominick Musto, Middlesex, all of N.J.

[73] Assignee: Symtron Systems, Inc., Fair Lawn, N.J.

Reexamination Request:
No. 90/003,809, Apr. 25, 1995

Reexamination Certificate for:
Patent No.: 4,861,270
Issued: Aug. 29, 1989
Appl. No.: 238,453
Filed: Aug. 30, 1988

Reexamination Certificate B1 4,861,270 issued Jan. 26, 1993

Certificate of Correction issued Dec. 10, 1991.

[51] Int. Cl.$^6$ .................................................. G09B 9/00
[52] U.S. Cl. ............................................................ 434/226

[56] References Cited

PUBLICATIONS

"Trainer Engineering Report for Device 19F1A Advanced Fire Fighting Surface Ship Trainer" Dec. 1985 to Mar. 1986.

Primary Examiner—Joe Cheng

[57] ABSTRACT

A fire fighting trainer for use in training fire fighters is provided. The fire fighting trainer includes a structure having a plurality of chambers. Each chamber contains real or simulated items, which are chosen from a group of items, such as furniture and fixtures and equipment. The trainer also includes a smoke generating system having a smoke generator and a smoke conduit. The smoke conduit has a smoke line with an outlet for each chamber. The trainer also includes a propane gas flame generating system having at least one propane gas pressure controller and a propane gas conduit. The propane gas conduit has a gas line with a burner control and a burner for each chamber. The trainer has a main control panel for regulating the flame generating system and the smoke generating system and for controlling the flame and smoke in each chamber. The trainer also has a sensor assembly in each chamber, which is connected to the main control panel to sense and report what extinguishing material or medium or agent is being used in each chamber during a test of trainees or fire fighters, so that the flame and smoke can be simultaneously reset to suit the conditions in the chamber based upon the reported extinguishing agent used. Each sensor assembly includes a water sensor, a foam sensor, a powder sensor, and a temperature sensor.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–7 is confirmed.

* * * * *